March 24, 1964  G. W. DILBEY  3,125,859
CABLE LAYING APPARATUS
Filed March 15, 1962
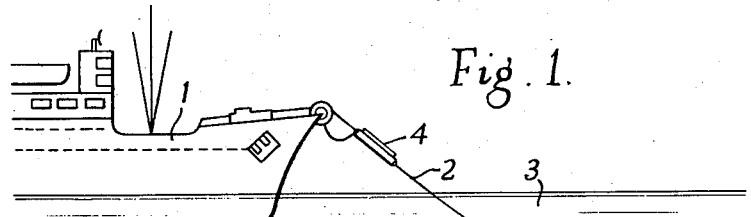
Fig. 1.
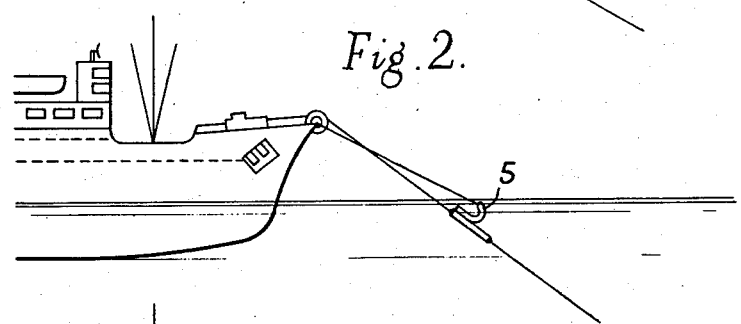
Fig. 2.
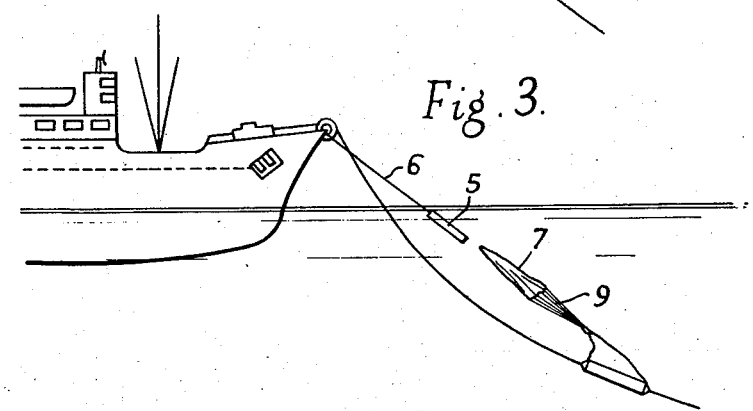
Fig. 3.
Fig. 4.
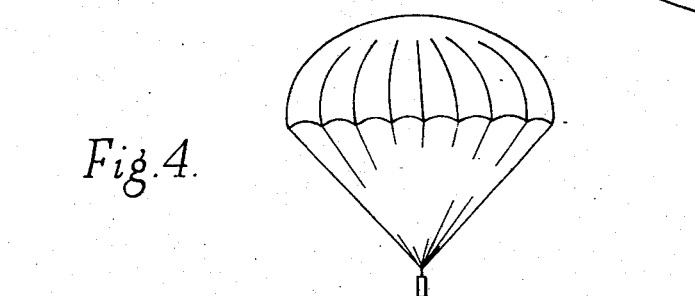
INVENTOR
GEOFFREY WILLIAM DILBEY
BY
ATTORNEYS 3,125,859
CABLE LAYING APPARATUS
Geoffrey William Dilbey, Woking, Surrey, England, assignor to G. Q. Parachute Company Limited, Woking, Surrey, England, a British company
Filed Mar. 15, 1962, Ser. No. 179,917
Claims priority, application Great Britain Mar. 20, 1961
6 Claims. (Cl. 61—72.3)

This invention is for improvements in or relating to parachutes.

The principal object of the present invention is to provide means for accurately regulating the rate at which an object sinks through water.

The invention consists in a method of regulating the rate at which an object sinks through water which includes the step of deploying a parachute below the surface of the water.

A further aspect of the present invention consists of a method of regulating the rate at which an object will sink through water which includes the steps of permitting the object to sink through the water under the influence of gravity during an initial period of time and deploying a parachute, at the end of said period of time, to lower the rate at which the object will sink.

Again the present invention consists of a parachute, which includes a canopy and rigging lines, and release means adapted to permit deployment of the canopy after an object which is attached to said rigging lines has fallen under the influence of gravity for a predetermined period of time.

Further the present invention consists of a parachute, which includes a canopy and rigging lines, and release means adapted to detach the parachute from an object immediately or substantially immediately the load makes contact with a solid surface.

The parachute hereinbefore referred to may be similar in design to those used for loads dropped from aircraft, the main canopy being of a shape and of a size which will be a function of the desired rate of descent of the object. The canopy may be made of rayon fabric with rigging lines made of nylon cord but the choice of materials may be varied to suit the conditions under which the parachute is to be employed.

The said first release means consists of a lock which is disabled as soon as a predetermined depth is reached (hydrostatically operated).

The said second release means, connected between the rigging lines and the object, forms a releasable link which is tripped when the weight of the sinking object is taken by the bed of the body of water.

The parachute is attached to the surface ship or aircraft by a static line and is, therefore, deployed at a convenient depth below the surface.

Alternatively, the parachute pack may be attached to a float which, by its buoyancy, supports the pack containing the object while the parachute is withdrawn from it.

The invention will be more particularly described with reference to the accompanying drawings which illustrate one method of carrying the invention into effect with reference to a cable laying ship.

FIGURES 1–3 show the means and the successive steps for deploying the cable of the instant invention.

FIGURE 4 shows a parachute attached to that part of the cable having a repeater thereon.

Referring to the drawings, there is illustrated a cable laying ship or support means 1 provided with cable laying gear (not shown) operable to feed a cable 2 from the bow thereof into water 3. Connected to the cable 2 is a repeater 4. The repeater 4 has connected to it a deployment sock or holding means 5 which is connected to the ship 1 by a static line or operating means 6 of a predetermined length. After a predetermined length of the cable 2 has been fed from the ship into the water, the deployment sock is separated from an associated parachute 7 by the static line 6. Upon the release of the sock 5 the parachute 7 opens and allows the repeater 4 suspended by rigging lines 9 therefrom to be lowered gently on to the surface below the water.

What I claim as my invention and desire to secure by Letters Patent of the United States is:

1. Apparatus comprising support means which will float on a body of water, elongated flexible cable means having a specific gravity greater than the water comprising said body of water and adapted to be laid on the bottom of said body of water, cable dispensing means supported on said support means and connected to said cable means so as to feed said cable means from said support means into said body of water, a parachute adapted to operate in water connected to a central portion of said cable means, holding means on said parachute retaining it closed, operating means connected to said holding means so as to automatically release said parachute after said portion of cable has been dispensed into said body of water and separated from said support means a predetermined distance, said parachute automatically opening after being released so as to limit the rate of descent of said cable means toward said bottom of said body of water.

2. Apparatus as defined in claim 1 wherein said holding means comprises a sock enclosing said parachute.

3. Apparatus as defined in claim 2 wherein said operating means comprises a static line of predetermined length secured to said sock and to said support means.

4. Apparatus as defined in claim 3 wherein said cable means includes a repeater and said parachute includes rigging lines secured to said repeater.

5. Apparatus as defined in claim 4 wherein said support means comprises a cable laying ship.

6. Apparatus as defined in claim 4 including release means connecting said rigging lines to said repeater, said release means automatically releasing said rigging lines from said repeater when said repeater contacts said bottom.

References Cited in the file of this patent

UNITED STATES PATENTS

| 25,151 | Turney | Aug. 16, 1859 |
| 1,506,784 | Sperry | Sept. 2, 1924 |
| 2,729,495 | Dejean | Jan. 3, 1956 |
| 2,852,217 | Engelhardt | Sept. 16, 1958 |
| 2,869,810 | Leonard | Jan. 20, 1959 |
| 2,960,297 | Cotter et al. | Nov. 15, 1960 |
| 2,969,213 | Iijima et al. | Jan. 24, 1961 |
| 2,981,505 | Oakley | Apr. 25, 1961 |
| 3,039,419 | Rimar | June 19, 1962 |

FOREIGN PATENTS

| 1,199 | Great Britain | 1863 |